United States Patent [19]
Radigan

[11] Patent Number: 5,999,735
[45] Date of Patent: Dec. 7, 1999

[54] METHOD FOR CONSTRUCTING A STATIC SINGLE ASSIGNMENT LANGUAGE ACCOMMODATING COMPLEX SYMBOLIC MEMORY REFERENCES

[75] Inventor: Jim J. Radigan, San Jose, Calif.

[73] Assignee: Intel Corporation, Santa Clara, Calif.

[21] Appl. No.: 08/831,074

[22] Filed: Apr. 1, 1997

[51] Int. Cl.⁶ .................................................. G06F 9/445
[52] U.S. Cl. ............................................................ 395/707
[58] Field of Search ................................... 395/709, 700, 395/707, 706

[56] References Cited

U.S. PATENT DOCUMENTS

| | | | |
|---|---|---|---|
| 5,287,510 | 2/1994 | Hall et al. | 395/700 |
| 5,293,631 | 3/1994 | Rau et al. | 395/707 |
| 5,448,737 | 9/1995 | Burke et al. | 395/709 |
| 5,475,842 | 12/1995 | Gilbert et al. | 395/706 |
| 5,659,754 | 8/1997 | Grove et al. | 395/709 |
| 5,768,596 | 6/1998 | Chow et al. | 395/709 |

OTHER PUBLICATIONS

Efficient Accomodation of May–Alias Information is SSA Form, by Cytron et al published at ACM 1993.

*Primary Examiner*—Tariq R. Hafiz
*Assistant Examiner*—Chameli C Das
*Attorney, Agent, or Firm*—Blakely, Sokoloff, Taylor & Zafman LLP

[57] ABSTRACT

The invention, in one embodiment is a method of creating a rank-n static single assignment intermediate language from a rank-(n−1) static single assignment intermediate language, where n is a positive integer. The method includes searching the rank-(n−1) static single assignment intermediate language for a rank-1 definition that reaches at least one use; and renaming the rank-1 definition and the at least one use to a compiler temporary.

16 Claims, 2 Drawing Sheets

| Intermediate Language | Rank-0 SSA Intermediate Language | Rank-1 SSA Intermediate Language | Rank-2 SSA Intermediate Language |
|---|---|---|---|
| i = 1 | $t_1$ = 1 | $t_1$ = 1 | $t_1$ = 1 |
| a = 2*i | $t_2$ = 2*$t_1$ | $t_2$ = 2*$t_1$ | $t_2$ = 2*$t_1$ |
| A[i] = a | A[$t_1$] = $t_2$ | $t_4$ = $t_2$ | $t_4$ = $t_2$ |
| b = 2*a | $t_3$ = 2*$t_2$ | $t_3$ = 2*$t_2$ | $t_3$ = 2*$t_2$ |
| c = A[i]*b | c = A[$t_1$]*$t_3$ | c = $t_5$*$t_3$ | c = $t_5$*$t_3$ |
| B[A[i]] = a | B[A[$t_1$]] = $t_2$ | B[$t_5$] = $t_2$ | $t_6$ = $t_2$ |
| d = B[A[i]] | d = B[A[$t_1$]] | d = B[$t_5$] | d = $t_6$ |

METHOD FOR CONSTRUCTING A STATIC SINGLE ASSIGNMENT LANGUAGE ACCOMMODATING COMPLEX SYMBOLIC MEMORY REFERENCES

RELATED APPLICATIONS

The invention disclosed and claimed herein is related to the following applications:

(1) my co-pending U.S. patent application Ser. No. 08/829,856, filed Apr. 1, 1997, entitled "A Method for Performing Common Subexpression Elimination on a Rank-n Static Single Assignment Language" (Attorney Docket No. INPA:016/P3938);

(2) my co-pending U.S. patent application Ser. No. 08/831,739, filed Apr. 1, 1997, entitled "A Method of Using Static Single Assignment to Color Out Artificial Register Dependencies" (Attorney Docket No. INPA:019/P3941);

(3) my co-pending U.S. patent application Ser. No. 08/829,847, filed Apr. 1, 1997, entitled "A Method for Identifying Partial Redundancies in Existing Processor Architectures" (Attorney Docket No. INPA:014/P3936);

(4) my co-pending U.S. patent application Ser. No. 08/829,933, filed Apr. 1, 1997, entitled "A Method for Identifying Partial Redundancies in a New Processor Architecture" (Attorney Docket No. INPA:021/P4306);

(5) my co-pending U.S. patent application Ser. No. 08/831,159, filed Apr. 1, 1997, entitled "A Method for Determining the Set of Variables that May Be Ambiguously Defined at a Point in a Computer Program" (Attorney Docket No. INPA:015/P3947); and (6) my co-pending U.S. patent application Ser. No. 08/829,980, filed Apr. 1, 1997, entitled "A Method for Optimizing a Loop in a Computer Program by Removing Loop-Invariant Loads Outside of a Loop" (Attorney Docket No. INPA:017/P3939).

These applications are hereby expressly incorporated by reference for all permissible purposes as if expressly set forth verbatim herein.

BACKGROUND OF THE INVENTION

1. Field of the Invention

The invention relates to a computer implemented method for constructing a static single assignment language that accommodates complex symbolic memory references. This method enables optimizing compilers to efficiently implement certain code-improving transformations.

2. Description of Related Art

Most computer programmers write computer programs in source code using high-level languages such as C, FORTRAN, or PASCAL. While programmers may easily understand such languages, modern computers are not able to directly read such languages. Thus, such computer programs must be translated into a language, known as machine language, that a computer can read and execute. One step in the translating process is performed by a compiler. A compiler translates a source code program into object code. Object code is a machine language description of a high-level computer program. Object code produced by conventional compiling algorithms may often be made to execute faster. This improvement is called optimization. Compilers that apply code-improving transformations are called optimizing compilers.

Some conventional optimizing compilers translate high-level computer programs into an intermediate language known as a Static Single Assignment (SSA) representation. This SSA intermediate language is used as a basis to perform certain optimizations. After these optimizations are performed, these conventional compilers translate the SSA intermediate language into optimized object code. A deeper explanation of SSA intermediate languages follows and employs the terminology set forth below.

A statement in a computer program is said to "define" a variable if it assigns, or may assign, a value to that variable. For example, the statement "x=y+z" is said to "define" x. A statement that defines a variable contains a "definition" of that variable. In this context, there are two types of variable definitions: unambiguous definitions and ambiguous definitions. Ambiguous definitions may also be called complex definitions.

When a definition consistently defines a particular variable, the definition is said to be an "unambiguous definition" of that variable. For example, the statement, "x=y" always assigns the value of y to x. Such a statement always defines the variable x with the value of y. Thus, the statement "x=y" is an "unambiguous definition" of x. If all definitions within a particular segment of code are unambiguous definitions, then the variable is known as an unambiguous variable.

Some definitions do not consistently define the same variable. These definitions may possibly define different variables at different times in a computer program. Thus, they are called "ambiguous definitions." There are many types of ambiguous definitions and the principal common denominator among the many types is that they are not unambiguous definitions. One type of "ambiguous definition" occurs where a pointer refers to a variable. For example, the statement "*p=y" may be a definition of x since it is possible that the pointer p points to x. Thus, the definition may ambiguously define any variable x if it is possible that p points to x. In other words, *p may define one of several variables depending on the value of p. Another type of ambiguous definition is a call of a procedure with a variable passed by reference. When a variable is passed by reference, the address of the variable is passed to the procedure. Passing a variable by reference to a procedure allows the procedure to modify the variable. Still another type of ambiguous definition is a procedure that may access a variable because that variable is within the scope of the procedure. A further type of ambiguous definition occurs when a variable is not within the scope of a procedure, but the variable has been identified with another variable that is passed as a parameter or is within the scope of the procedure. Ambiguous definitions are known by those skilled in the art.

When a statement in a computer program references a variable, the statement is said to "use" the variable. For example, the statement "x=y+z" refers to and is said to "use" y and z. Similarly, y and z (but not x) are "used" in the statement "x[y]=z." A statement that uses a variable contains a "use" of that variable.

A definition of a variable "reaches" a use of that variable if that definition is the last definition of that variable prior to the use. Consider the following straight-line C pseudo code:

$x=6$ $x=x+5$ $x=7$ $x=x+8$

The definition in the first statement "x=6" reaches the use in the second statement "x=x+5." Similarly, the definition in the third statement "x=7" reaches the use in the fourth statement "x=x+8." Note that the definition in the first statement does not reach the use of the fourth statement because x is redefined in the second and third statements.

In the above example, the definitions of x in the second and third statements are said to "kill" the definition of x in the first statement in that they nullify the effects of the definition in the first statement. Only unambiguous definitions of a variable can kill other definitions of the variable. Thus, a use can be reached by both an unambiguous definition and a subsequent ambiguous definition of the same variable.

A computer programmer may address a variable by specifying the variable's location in memory. This location is known as the variable's absolute address. This method of addressing is known as direct addressing. Direct addressing commonly occurs when a variable is specified by its name. For example, in the statement "y=x," both y and x are directly addressed.

A computer programmer may also address a variable by specifying an address that refers to a different address, which may specify yet another address. This method of addressing is known as indirect addressing. Common examples of indirect addressing include pointers, arrays and combinations of pointers and arrays. Examples of indirect addressing include a[i], *p, *(p+4), **p, a[b[i]], and *(*p+4). When a variable is indirectly addressed, at least one indirect memory reference is employed to determine the absolute address of the variable.

A variable may be classified based upon the number of indirect memory references employed to determine the absolute address of the variable. For example, as discussed above, y and x may be directly addressed. Thus, there are zero indirect memory references employed to determine the absolute address of both y and x. These variables will be referred to as rank-0 variables.

A variable employing a single indirect memory reference will be referred to as a rank-1 variable. Examples of rank-1 variables include single pointer references and single array references such as a[i], *p, and *(p+4). A variable that requires two indirect memory references will be referred to as a rank-2 variable. Rank-2 variables include double pointer references and double array references and the combination of a single pointer reference and a single array reference. Examples of rank-2 variables include **p, a[b[i]], and *(*p+4). A rank-n variable employs n indirect memory references to determine the absolute address of the variable.

A definition that defines a rank-n variable will be referred to as a rank-n definition. Similarly a use of a rank-n variable will be referred to as a rank-n use. For example, the definition of the array element b[a[i]] is a rank-0 use of the variable i, a rank-1 use of the array element a[i], and a rank-2 definition of the array element b[a[i]].

Returning to the discussion of SSA intermediate languages, when a computer program is conventionally translated into a SSA intermediate language, each variable definition is given a unique name. Further, all the uses reached by that definition are also renamed to match the variable's new name. For example, consider the straight-line C pseudo code discussed above. When this C pseudo code is translated into a SSA intermediate language, the result would be the following:

$t_1 = 6$ $t_2 = t_1 + 5$ $t_3 = 7$ $t_4 = t_3 + 8$

The symbols $t_1$ through $t_4$ represent compiler temporaries. Compiler temporaries are also known by those skilled in the art as temps. Unlike most variables, temps have only a single definition. Because a temp has only a single definition, it may not be defined by an ambiguous definition. Thus, temps are unaliasable scalars. Because temps are unaliasable scalars, an expression using $t_1$ has a different symbolic meaning from the symbolic meaning of an otherwise identical expression using i. Every use of i cannot be considered equal because i represents an aliasable variable. However, every use of $t_1$ can be considered equal. While a compiler may not be able to determine the value contained in a temp, every use of that temp will return the same unknown value. Therefore, temps dramatically simplify certain compiler algorithms.

Unlike the above straight-line C pseudo code, programs typically also contain branch statements. A branch statement is a statement that selects one set of statements from a number of alternative sets of statements. For example, consider the following if-then-else statement:

if (p) then

{ x = 4 } else

{ x = 6 } x = 2+x

The flow of control through this segment of code during execution will branch depending on whether p is true or false and will unite again at the statement "x=2+x." The point where it unites is known as the "join point" or the "confluence point."

When this C pseudo code is translated into a SSA intermediate language, the result would be the following:

if (p) then

{ $t_1 = 4$ } else

{ $t_2 = 6$ }

$t_3 = \Phi(t_1, t_2)$ $t_4 = 2 + t_3$

Depending on the value of p, either $t_1$ will be defined as 4 or $t_2$ will be defined as 6. In order to "join" these two definitions, a special definition called a phi-function (e.g., "$\Phi(x,x)$") is inserted at the point where the branches join. A phi-function, which is known in the art, is a function that makes explicit a confluence point for multiple definitions that reach a particular point in a computer program.

The above phi-function contains two operands. An operand is a quantity that enters into (or results from) an operation. The operands indicate which definitions reach the join point. In this example, both $t_1$ and $t_2$ reach the join point. Thus, both $t_1$ and $t_2$ are operands to the phi-function that defines $t_3$. As shown above, subsequent uses of x in the original program would use $t_3$ in the corresponding SSA intermediate language.

Conventional SSA intermediate languages can accommodate only rank-0 variables. Ambiguous definitions and uses reached by ambiguous definitions cannot be renamed as temps. Phi-nodes also cannot be inserted in conventional SSA intermediate languages without temps. Therefore, phi-nodes cannot conventionally be inserted in the presence of ambiguity interjected by ambiguous definitions and their uses. Thus, rank-1 and rank-2 variables are not included in conventional SSA intermediate languages. Because such intermediate languages contain only a limited amount of symbolic information, only limited optimizations may be based on such languages. Thus, in order to perform significant optimizations, numerous ad hoc algorithms are employed. These conventional algorithms are inefficient, incomplete, not well defined, and complex.

SUMMARY OF THE INVENTION

The invention, in one embodiment, is a method of creating a rank-n static single assignment intermediate language from a rank-(n−1) static single assignment intermediate language, where n is a positive integer. The method includes searching the rank-(n−1) static single assignment intermediate language for a rank-1 definition that reaches at least one use; and renaming the rank-1 definition and the at least one use to a compiler temporary.

BRIEF DESCRIPTION OF THE DRAWINGS

A more particular description of the invention briefly summarized above is set forth below by way of particular embodiments disclosed in the drawings of this specification and as described in connection therewith. The drawings nevertheless illustrate only typical, particular embodiments of the invention and are not to be considered limiting thereon as the invention may admit to other equally effective embodiments. In the drawings.

DETAILED DESCRIPTION OF PARTICULAR EMBODIMENTS

Numerous specific details are set forth below in the detailed description of particular embodiments in order to provide a thorough understanding of the present invention. However, one of ordinary skill in the art having the benefit of this disclosure will understand that the present invention may be practiced without many of the details presented since such details will be necessary or useful depending on the particular embodiment being employed. Conversely, in other instances, well known details have not been described in detail for the sake of clarity so as not to obscure the invention. It will be appreciated that supplying such details would be a routine undertaking for those of ordinary skill in the art, even if a complex and time-consuming task, given the benefit of this disclosure.

Figure 1:
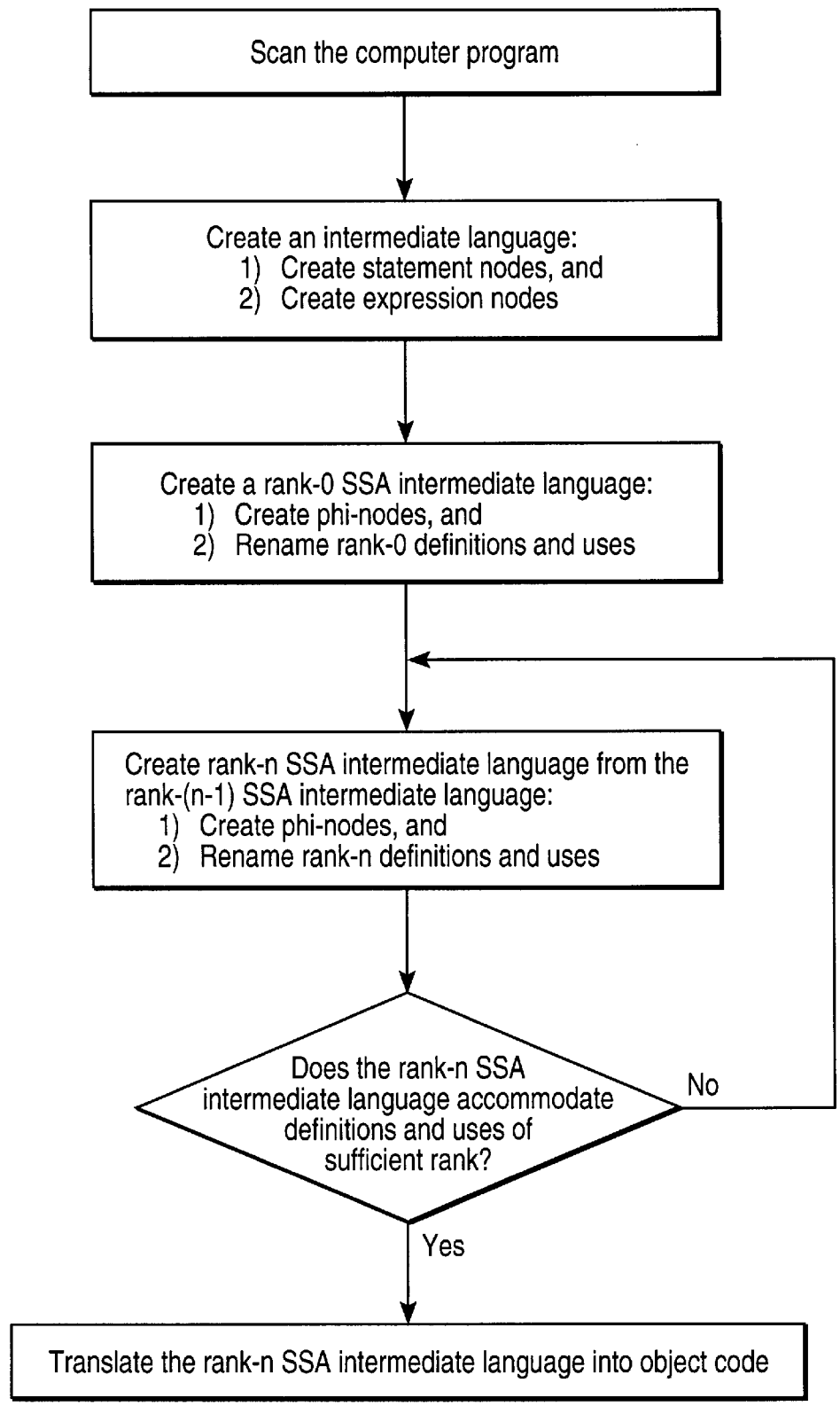
FIG. 1 is a flow diagram of one particular embodiment for creating a rank-n static single assignment intermediate language in accordance with the present invention.

FIG. 1 presents one embodiment for creating a static single assignment (SSA) intermediate language that can accommodate rank-n variables. A SSA intermediate language that can accommodate rank-n variables will be referred to as a rank-n SSA intermediate language.

Referring to FIG. 1, the compiler performs a linear analysis of a source computer program. The source computer program typically is in a high-level language. Alternatively, it may also be stored in a lower-level language. This linear analysis is often called scanning. Scanning is well known by those skilled in the art. The stream of characters in the source computer program is typically read from left to right. When the stream of characters is scanned, the characters are grouped into sequences of characters having a collective meaning. These sequences of characters are known as tokens. The character stream "area=2 * pi * r" could be grouped into the following tokens:

(1) The identifier area;
(2) The assignment symbol =;
(3) The number 2;
(4) The multiplication sign;
(5) The identifier pi;
(6) The multiplication sign; and
3 (7) The identifier r.

Scanning the source computer program results in a plurality of tokens. The blanks between the tokens are typically eliminated.

Referring again to FIG. 1, after scanning the source computer program, the compiler then groups the plurality of tokens into a hierarchical structure that will be referred to as an intermediate language. A hierarchical structure is a structure having several levels arranged in a tree-like structure. This grouping of the tokens is known by those skilled in the art as parsing. Common parsing methods include top-down and bottom-up methods. The intermediate language may be represented by a parse tree, although it is not necessary to construct a formal parse tree. All that is needed is a data structure containing the relationship between the tokens.

In one embodiment there may be two major types of nodes in the intermediate language: statement nodes and expression nodes. The particular types of nodes used in the intermediate language is immaterial. All that is necessary is that the statements and expressions in the source computer program be properly related in a data structure.

Statement nodes represent program constructs. A program construct is a statement or a part of a statement in a computer language. Common program constructs include: assign, if, while, goto, switch, repeat, call, and return. Statement nodes contain program flow information. Typically, a field in a statement node includes a pointer to one or more other statements nodes. For example, a field in a statement node that represents the assign program construct may point to a previous statement node and another field may point to a subsequent statement node. A statement node that represents the assign program construct typically contains one definition and possibly one or more uses.

Statement nodes may represent conditional constructs. A conditional construct is a statement or part of a statement that specifies several different execution sequences. Examples of conditional constructs include: if, while, goto, switch, repeat, call, and return. Statement nodes that represent conditional constructs include control flow information. For example, a statement node that represents the "if" conditional construct may contain two additional pointers. The first pointer would point to a statement node that is to be executed if a given expression is true. The second pointer would point to a statement node that is to be executed if the given expression is false. A statement node that represents an if-then-else conditional program construct may include the following information:

(1) Number: A unique integer that allows reference to a particular statement node via an integer index.
(2) Predecessor: A pointer to a previous statement node. This pointer allows the statement nodes to be efficiently stored in a doubly linked list.

(3) Successor: A pointer to a subsequent statement node.

(4) SATT: A bitset of statement node attributes. Possible attributes of a statement node include processed, optimized, and unreachable.

(5) DBG-node: A field that allows attachment of debugger annotations.

(6) Bblock: The basic block that contains the statement.

(7) Ins: The uses of the expression.

(8) Outs: The definitions of the expression.

(9) If-expr: The expression that is to be evaluated by an if statement. This expression predicates whether the true side or the false side is to be taken.

(10) If-true: The first statement to be executed if the if-expr is true.

(11) If-false: The first statement to be executed if the if-expr is false.

However, this list is neither exclusive nor exhaustive as one of ordinary skill in the art having the benefit of this disclosure will appreciate.

Expression nodes represent expressions. An expression is a program construct for computing a value from one or more operands such as constants, variables, temps, and/or pointers. An expression may include a group of constants or variables separated by operators that yield a single value. Common operators include: add, subtract, multiply, divide, shift left, shift right, and convert. An expression may be arithmetic, relational, logical, or even a character string. An individual expression node may represent an operation, a scalar variable, an array variable, a constant, a temp, or a memory reference. A scalar variable is a variable that represents a single data item. A scalar variable may be contrasted with an array variable that represents many data items.

Expression nodes that represent operations may contain two fields that point to other expression nodes. One of the fields may point to another expression node that represents another operation. The second field may point to an expression node that represents a constant, a variable, or a temp. For example, the expression "a+b+4+$t_5$" may be represented by the following grouping of expression nodes:

```
        +
       / \
     t₅   +
         / \
        4   +
           / \
          a   b
```

The expression "A[i][j]" may be may be represented by the following grouping of expression nodes:

```
        []
       / \
     []   j
    / \
   A   i
```

An expression node for an operation such as "addition" may include the following information:

(1) Number: A unique integer that allows reference to a particular expression via an integer index.

(2) OP: A word indicating the operation of the expression node.

(3) Succ-cnt: The number of operands in the expression tree of the expression node. (The number of operands varies depending upon the operation.)

(4) N-words: pointers to the operands in the expression tree.

However, this list is neither exclusive nor exhaustive as one of ordinary skill in the art having the benefit of this disclosure will appreciate.

Expression nodes are typically used as operands for statement nodes. For example, consider the following if-then-else statement.

if (x = 5) then

{ x = 4 } else

{ x = 6 } x = 2+x

Figures 2, 3:
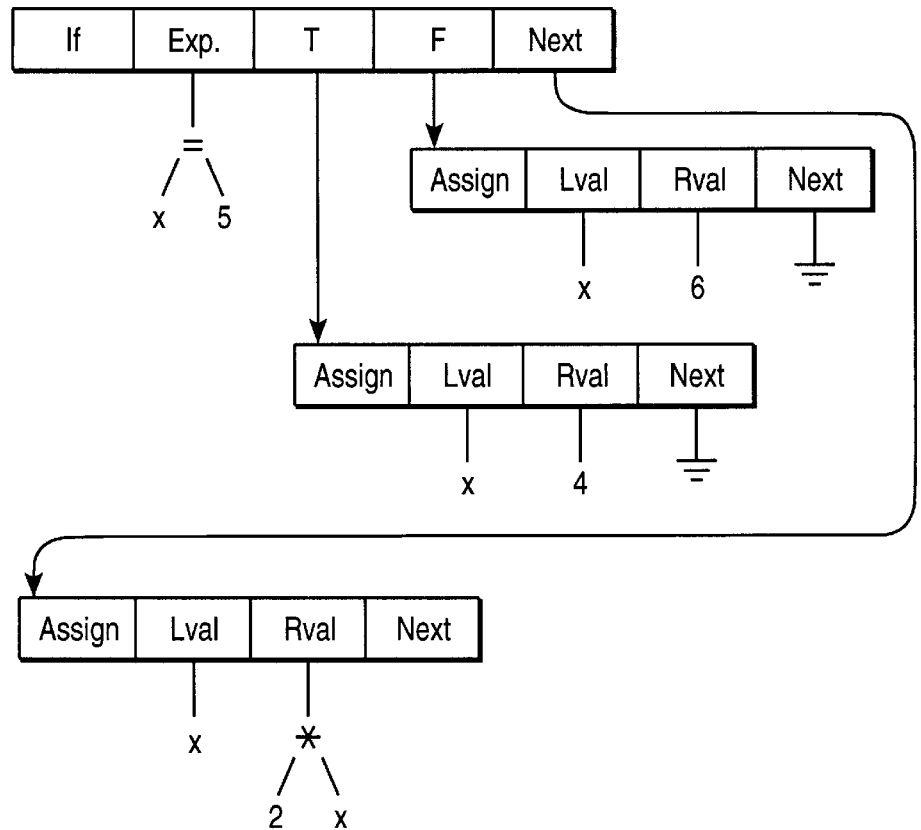
FIG. 2 illustrates an intermediate language representation of an if-then-else statement.
FIG. 3 is a table containing the results of renaming several variables in accord with the present invention.

This statement may be represented by the group of nodes shown in FIG. 2, which illustrates an intermediate language representation of the above if-then-else statement.

Referring again to FIG. 1, the tokens are next translated into nodes. If a token represents a program construct, then a statement node is created in the intermediate language that represents the program construct. This statement node typically includes program flow information and possibly control flow information. If a token represents an expression, then an expression node is created in the intermediate language that represents the expression. Typically, these expression nodes are operands to statement nodes.

Referring again to FIG. 1, after the intermediate language is created, then a rank-0 SSA intermediate language is created.

The compiler first searches the intermediate language for join points. A special statement node, known as a phi-node, is typically inserted in the rank-0 SSA intermediate language at certain join points. A phi-node may optimally include the following information:

(1) Number: A unique integer that allow reference to a particular phi-node via an integer index.

(2) Predecessor: A pointer to a previous phi-node. This pointer allows the phi-nodes to be efficiently stored in a doubly linked list.

(3) Successor: A pointer to a subsequent phi-node.

(4) SATT: A bitset of phi-node attributes. Possible attributes of a phi-node include processed, optimized, and unreachable.

(5) DBG-node: A field that allows attachment of debugger annotations.

(6) Bblock: The basic block that contains the phi-node.

(7) Ins: The uses of the phi-node.

(8) Lval: The variable definition.

(9) Defs: The operand list of the phi-node.

However, this list is neither exclusive nor exhaustive as one of ordinary skill in the art having the benefit of this disclosure will appreciate.

Proper placement of phi-nodes may reduce the compiler execution time and may also reduce the execution time of the computer program. It is conservative, i.e., safe, but inefficient to place phi-nodes at every join point in the SSA intermediate language. A more optimal method may be placing a phi-node immediately preceding all statement nodes that contain a use that has multiple reaching definitions. Such uses may be located by performing a depth-first search of the rank-0 SSA intermediate language. Algorithms for placing phi-nodes are known in the art. Two such algorithms are shown in Ron Cytrol et al., *Efficiently Computing Static Single Assignment Form and the Control Dependence Graph*, ACM Transactions on Programming Languages and Systems, Vol. 13, No. 4, October 1991 and Vugranam C. Sreedhar, *Efficient Program Analysis Using DJ Graphs*, Ph.D. Thesis, School of Computer Science, McGill Univ., Quebec, Canada, 1995, the disclosures of which are hereby expressly incorporated by reference.

The compiler then renames certain definitions and uses. A search of the intermediate language is made for any statement nodes that contain a rank-0 definition of a variable that reaches a statement node containing a rank-0 use of that variable. A depth-first search of the intermediate language may be optimal because it provides an efficient searching method. A depth-first search is a search of a hierarchical data structure that first chooses one of the possible branches of a search tree, proceeds along the chosen branch until the goal or a predetermined depth is reached, and if the goal has not been reached, goes back to the starting point and chooses another branch. Depth-first searches of hierarchical data structures are known by those skilled in the art. If a statement node that contains a rank-0 definition that reaches a statement node containing a rank-0 use is found during the depth-first search, then the rank-0 definition and the rank-0 use are renamed with a temp.

Consider the series of intermediate language computer program statements shown in FIG. 3. This series includes a rank-0 definition of the variable i that reaches five rank-0 uses of i. Thus, as shown in FIG. 3, when the rank-0 SSA intermediate language is created, i will be renamed to $t_1$ in the rank-0 definition and the five rank-0 uses. This renaming may occur because each of the five uses of i in the intermediate language will return the same value when the computer program is executed.

Referring again to FIG. 1, a rank-1 SSA intermediate language may be created from the rank-0 SSA intermediate language. As discussed above, the rank-0 SSA intermediate language accommodates only rank-0 definitions and rank-0 uses. Rank-1 and higher rank definitions and uses are not accommodated. Rank-1 definitions and rank-1 uses may be accommodated by renaming all rank-1 definitions in the rank-0 SSA intermediate language that reach a use.

Consider the series of computer program statements in the rank-0 SSA intermediate language shown in FIG. 3. The series contains a rank-1 definition and two rank-1 uses of the array element $A[t_r]$. Thus, as shown in FIG. 3, when the rank-1 SSA intermediate language is created, $A[t_r]$ will be renamed to $t_4$ in the rank-1 definition and the two rank-1 uses. This renaming may be performed because both uses of $A[t_1]$ in the rank-0 SSA intermediate language will return the same value when the computer program is executed.

Generally, any rank-(n−1) SSA intermediate language may be translated into a rank-n SSA intermediate language, by renaming all rank-1 definitions in the rank-(n−1) SSA intermediate language that reach a use.

Consider the series of computer program statements in the rank-1 SSA intermediate language shown in FIG. 3. In this example, the rank-1 SSA intermediate language will be considered to be a rank-(n−1) SSA intermediate language. The series contains a rank-1 definition and a rank-1 use of the array element $B[t_5]$. Thus, as shown in FIG. 3, when a rank-n, i.e., rank-2, SSA intermediate language is created, $B[t_5]$ will be renamed to $t_6$ in the rank-1 definition and the rank-1 use.

The above renaming process may consequently be repeated until a SSA intermediate language is created that accommodates definitions and uses of a sufficient rank. At the end of each renaming pass, the compiler may determine whether the current SSA intermediate language representation accommodates definitions and uses of sufficient rank. If so, the compiler can move to the next phase of the process. If not, then the phi-node insertion and renaming phase may be reiterated.

Again referring to FIG. 1, after the rank-n SSA intermediate language is created, it may be translated into object code or optionally into machine language. This translation enables a computer to directly execute the computer program.

Other alternative embodiments may eliminate common subexpressions and/or propagate ambiguous constants throughout the intermediate language representation. The common subexpressions can be eliminated during the renaming phase of the present invention as set forth in my co-pending U.S. patent application Ser. No. 08/829,856 entitled "A Method for Performing Common Subexpression Elimination on Rank-n Static Single Assignment Language." The ambiguous constant propagation is disclosed and claimed in my co-pending U.S. patent application Ser. No. 08/831,159, filed herewith, entitled "A Method for Determining the Set of Variables that May Be Ambiguously Defined at a Point in a Computer Program." Each of these applications was previously incorporated by reference.

Still other alternative embodiments are possible or even desirable. Alternative embodiments may include, for instance:

(1) eliminating partial redundancies such as, for example, is set forth in my co-pending U.S. patent application Ser. No. 08/829,847, entitled "A Method For Identifying Partial Redundancies in Existing Processor Architectures" and in my co-pending U.S. patent application Ser. No. 08/829,933 entitled "A Method for Identifying Partial Redundancies in a New Processor Architecture;"

(2) coloring out artificial register dependencies such as, for example, is set forth in my co-pending U.S. patent application Ser. No. 08/831,739, filed Apr. 1, 1997, entitled "A Method of Using Static Single Assignment to Color Out Artificial Register Dependencies;" and (3) eliminating loop invariant motion such as, for example, is set forth in my co-pending U.S. patent application Ser. No. 08/829,980, filed Apr. 1, 1997, entitled "A Method for Optimizing a Loop in a Computer Program by Removing Loop-Invariant Loads Outside of a Loop."

Each of these applications was previously incorporated by reference. Indeed, one alternative embodiment of the present invention incorporates all the variations discussed above as set forth in FIG. 4.

Any of the foregoing methods may be implemented by programming a suitable general purpose computer. The programming may be accomplished through the use of a program storage device readable by the general purpose computer and encoding a program of statements executable by the computer for performing the operations described above. The program storage device may take the form of, e.g., one or more floppy disks, a hard disk, a CD ROM or other optical or magnetic-optical disk, a magnetic tape, a read-only memory chip (ROM), and other kinds of storage devices. The program of statements may be source code or object code, or a high-level language, or in some intermediate form such as partially compiled code. The precise forms of the program storage device and of the encoding of statements are immaterial.

A primary advantage of the above described method of creating a rank-n SSA intermediate language is that it provides a uniquely simple framework for performing many optimizations such as those described in the related applications identified and incorporated by reference above. By including pointer and array references in a rank-n SSA intermediate language, such optimizations may be performed in an efficient manner.

Another advantage of the above described methods is that the size of a compiler utilizing a rank-n SSA intermediate language may be significantly smaller than a conventional compiler. This decrease in compiler size results in a decrease in compiler system maintenance, results in a decreased time to market, and decreases compile time. Further, by decreasing the compiler size, the compiler may be executed on less sophisticated computer hardware than conventional compilers.

Another advantage of the above described methods is that they preserve the meaning of computer programs. That is, the methods do not change the output produced by a program for a given input or cause an error that was not present in the original version of the computer program. Thus, the methods are "safe" methods.

It will be appreciated by those of ordinary skill having the benefit of this disclosure that the illustrative embodiments described above are capable of numerous variations without departing from the scope and spirit of the invention. While the particular embodiments disclosed above are presented utilizing C pseudo code, they are not limited to C. The invention may be applied to any computer program such as C++, FORTRAN, COBOL, PASCAL, etc. Furthermore, the methods may by performed on a computer program written or stored in object code or machine language as well as source code. Still further, the methods may be performed on a computer program stored in an intermediate compiler language that may be utilized to perform other optimizations prior to translation to object code.

Accordingly, the exclusive rights sought herein are as described in the claims below.

What is claimed is:

1. A method of creating a rank-n static single assignment intermediate language commencing from a rank-0 static single assignment intermediate language, where n is a positive integer, the method comprising:
   (a) searching the rank-0 static assignment intermediate language for a rank-1 definition that reaches at least one use;
   (b) renaming the rank-1 definition and the at least one use to a compiler temporary and;
   (c) repeating acts (a) and (b) for each subsequent static assignment intermediate language rank above rank-0 to rank-n until all rank definitions of a higher rank that reach at least one use are renamed.

2. The method of claim 1 wherein a static single assignment intermediate language of a particular rank includes a plurality of statement nodes and a plurality of expression nodes.

3. The method of claim 1 wherein the act of searching to the rank-n static single assignment intermediate language for a rank definition of a higher rank that reaches at least one use includes searching a less than rank-n static single assignment intermediate language for a rank-n definition that reaches at least one use.

4. The method of claim 1 wherein the method is performed by a general purpose computer operating on a computer program.

5. A method of compiling a computer program, the method comprising:
   (a) scanning the computer program;
   (b) creating an intermediate language;
   (c) creating a rank-0 static single assignment intermediate language from the intermediate language by;
      (c1) searching the rank-0 static assignment intermediate language for a rank-1 definition that reaches at least one use; and
      (c2) renaming the rank-1 definition and the at least one use to a compiler temporary;
   (d) repeating acts (c1) and (c2) to create each subsequent static assignment intermediate language rank above rank-0 to rank-n until all rank definitions of a higher rank that reach at least one use are renamed; and
   (e) translating the rank-n static single assignment intermediate language into object code.

6. The method of claim 5 wherein the act of creating a static single assignment intermediate language of a particular rank includes creating the static single assignment intermediate language with a plurality of statement nodes and a plurality of expression nodes.

7. The method of creating a rank-n static single assignment intermediate language from a computer program, the method comprising:
   (a) scanning the computer program;
   (b) creating an intermediate language;
   (c) creating a rank-0 static single assignment intermediate language from the intermediate language by;
      (c1) searching the rank-0 static assignment intermediate language for a rank-1 definition that reaches at least one use; and
      (c2) renaming the rank-1 definition and the at least one use to a program temporary;
   (d) repeating acts (c1) and (c2) to create each subsequent static assignment intermediate language rank above rank-0 to rank-n until all rank definitions of a higher rank that reach at least one use are renamed.

8. The method of claim 7 wherein the act of searching to the rank-n static single assignment intermediate language for a rank definition of a higher rank that reaches at least one use includes searching a less than rank-n static single assignment intermediate language for a rank-n definition that reaches a use.

9. The method of claim 7 wherein the act of creating a rank-0 static single assignment intermediate language includes renaming at least one rank definition above rank-0 that reaches a use.

10. The method of claim 7 wherein the act of creating a static single assignment intermediate language of a particular rank includes creating the static single assignment intermediate language with a plurality of statement nodes and a plurality of expression nodes.

11. A program storage device readable by a general purpose computer, the program storage device encoding statements for performing a method of creating a rank-n static single assignment intermediate language from a rank-0 static single assignment intermediate language, where n is a positive integer, the method comprising:
   (a) searching the rank-0 static single assignment intermediate language for a rank-1 definition that reaches at least one use;
   (b) renaming the rank-1 definition and the at least one use to a program temporary
   (c) repeating acts (a) and (b) for each subsequent static assignment intermediate language rank above rank-0 to rank-n until all rank definitions of a higher rank that reach at least one use are renamed.

12. A program device readable by a general purpose computer, the program storage device encoding statements for performing a method of compiling a computer program, the method comprising:

(a) scanning the computer program;

(b) creating an intermediate language;

(c) creating a rank-0 static single assignment intermediate language from the intermediate language by;

(c1) searching the rank-0 static single assignment intermediate language for a rank-1 definition that reaches at least one use; and (c2) renaming the rank-1 definition and the at least one use to a compiler temporary;

(d) repeating acts (c1) and (c2) to create each subsequent static assignment intermediate language rank above rank-0 to rank-n until all rank definitions of a higher rank that reach at least one use are renamed; and (e) translating the rank-n static single assignment intermediate language into object code.

13. An object code of a computer program compiled by a method comprising:

(a) scanning the computer program;

(b) creating an intermediate language;

(c) creating a rank-0 static single assignment intermediate language from the intermediate language by;

(c1) searching the rank-0 static assignment intermediate language for a rank-1 definition that reaches at least one use; and (c2) renaming the rank-1 definition and the at least one use to a compiler temporary:

(d) repeating acts (c1) and (c2) to create each subsequent static assignment intermediate language rank above rank-0 to rank-n until all rank definitions of a higher rank that reach at least one use are renamed; and (e) translating the rank-n static single assignment intermediate language into object code.

14. A method of producing an object code comprising:

(a) creating an intermediate language;

(b) creating a rank-0 single assignment intermediate language from the intermediate language; and (c) creating a rank-1 static single assignment intermediate language from the rank-0 static single assignment intermediate language by;

(c1) searching the rank-0 static assignment intermediate language for a rank-1 definition that reaches at least one use; and (c2) renaming the rank-1 definition and the at least one use to a program temporary;

(d) repeating acts (c1) and (c2) to create each subsequent static assignment intermediate language rank above rank-0 to rank-n until all rank definitions of a higher rank that reach at least one use are renamed; and (e) translating the rank-n static single assignment intermediate language into object code.

15. A method of producing a machine readable code comprising:

(a) creating an intermediate language;

(b) creating a rank-0 single assignment intermediate language from the intermediate language; and (c) creating a rank-1 static single assignment intermediate language from the rank-0 static single assignment intermediate language by;

(c1) searching the rank-0 static assignment intermediate language for a rank-1 definition that reaches at least one use; and (c2) renaming the rank-1 definition and the at least one use to a program temporary;

(d) repeating acts (c1) and (c2) to create each subsequent static assignment intermediate language rank above rank-0 to rank-n until all rank definitions of a higher rank that reach at least one use are renamed; and (e) translating the rank-n static single assignment intermediate language into machine readable code.

16. A machine readable code of a computer program compiled by a method comprising:

(a) scanning the computer program;

(b) creating an intermediate language;

(c) creating a rank-0 static single assignment intermediate language from the intermediate language by;

(c1) searching the rank-0 static assignment intermediate language for a rank-1 definition that reaches at least one use; and (c2) renaming the rank-1 definition and the at least one use to a compiler temporary;

(d) repeating acts (c1) and (c2) to create each subsequent static assignment intermediate language rank above rank-0 to rank-n until all rank definitions of a higher rank that reach at least one use are renamed; and (e) translating the rank-n static single assignment intermediate language into object code; and (f) translating the object code into machine readable code.

* * * * *